United States Patent
Wang

(10) Patent No.: US 7,230,056 B2
(45) Date of Patent: Jun. 12, 2007

(54) CATALYST PREPARATION METHOD

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/173,029

(22) Filed: Jul. 1, 2005

(65) Prior Publication Data

US 2007/0004882 A1    Jan. 4, 2007

(51) Int. Cl.
*C08F 4/52* (2006.01)
*B01J 31/14* (2006.01)

(52) U.S. Cl. .................. 526/153; 526/134; 526/172; 526/161; 526/943; 526/351; 526/348.6; 526/348.2; 502/104; 502/114

(58) Field of Classification Search ........... 526/172, 526/161, 134, 153, 127
See application file for complete search history.

(56) References Cited

U.S. PATENT DOCUMENTS

| | | | |
|---|---|---|---|
| 5,198,401 A | 3/1993 | Turner et al. ............. 502/155 |
| 6,211,311 B1 | 4/2001 | Wang et al. ............. 526/131 |
| 6,232,260 B1 | 5/2001 | Nagy et al. ............. 502/155 |
| 6,451,724 B1 | 9/2002 | Nifant'ev et al. ........... 502/103 |
| 6,559,251 B1 | 5/2003 | Mack et al. ............. 526/127 |
| 6,583,242 B2 * | 6/2003 | Beran et al. ............. 526/161 |
| 6,693,155 B1 | 2/2004 | Meverden et al. .......... 526/160 |
| 6,759,361 B2 | 7/2004 | Lynch et al. ............. 502/102 |
| 6,794,468 B1 | 9/2004 | Wang .................. 526/161 |
| 6,818,713 B1 | 11/2004 | Wang et al. ............. 526/161 |
| 6,838,410 B2 | 1/2005 | Wang et al. ............. 502/103 |
| 6,908,972 B2 | 6/2005 | Tsuie et al. ............. 526/160 |

FOREIGN PATENT DOCUMENTS

WO    WO 99/24446    5/1999
WO    WO 01/53360    7/2001

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

A two-step catalyst preparation method is disclosed. First, a support is combined with an indenoindolyl Group 3-10 metal complex and a first activator comprising an alkyl alumoxane to give a supported complex. The supported complex is subsequently combined with a second activator comprising an ionic borate to produce a borate-treated supported complex. Activating indenoindolyl metal complexes in this sequence surprisingly provides an exceptional activity boost compared with other ways of activating them with either or both types of activators.

12 Claims, No Drawings

US 7,230,056 B2

CATALYST PREPARATION METHOD

FIELD OF THE INVENTION

The invention relates to single-site catalysts used for olefin polymerization, and particularly to an improved method for making the catalysts. The method provides an unexpected boost in catalyst activity.

BACKGROUND OF THE INVENTION

Ziegler-Natta catalysts are a mainstay for polyolefin manufacture, but single-site (metallocene and non-metallocene) catalysts represent the industry's future. These catalysts are often more reactive than Ziegler-Natta catalysts, and they can produce polymers with improved physical properties.

Organometallic complexes that incorporate "indenoindolyl" ligands are known (see, e.g., U.S. Pat. Nos. 6,232,260 and 6,451,724). In many of the known complexes, an indenoindolyl group is bridged to another group, which may be a second indenoindolyl group. Some of the known bridged indenoindolyl complexes have constrained geometry or "open architecture" (see, e.g., U.S. Pat. No. 6,838,410). Indenoindolyl ligands are versatile because a wide variety of indanone and arylhydrazine precursors can be used to produce indenoindoles. Thus, substituent effects can be exploited and catalyst structure can be altered to produce improved polyolefins.

Finding the best way to activate catalyst systems based on indenoindolyl metal complexes, particularly supported complexes, is a continuing challenge. Routinely employed activators include alumoxanes (e.g., methyl alumoxane (MAO)), ionic borates (e.g., trityl tetrakis(pentafluorophenyl)borate (F20)), and alkylaluminum compounds (e.g., triethylaluminum, diethylaluminum chloride), while other more exotic activators such as aluminoboronates have also been used. (see U.S. Pat. No. 6,759,361).

Usually, a single activator is used, although mixtures of activators have been taught. Moreover, the support material is commonly treated with organoaluminum, organomagnesium, organoboron, or other reagents (see, e.g., U.S. Pat. No. 6,211,311), prior to combining it with the transition metal complex and any additional activator. Among the organoaluminum compounds often used to treat the support are alumoxanes and alkylaluminum compounds.

Not specifically taught is the idea of using multiple activation steps (not including the support treatment). For example, U.S. Pat. No. 6,559,251 teaches to combine an indenoindolyl titanium complex with triethylaluminum-treated silica, then activate the complex with F20 (see Example 4). In other examples, the catalyst is made by pre-treating silica with MAO, then combining the MAO-treated silica with a mixture of MAO and the transition metal complex. A subsequent activation step is not used.

U.S. Pat. No. 6,583,242 teaches catalyst systems comprising MAO-treated silica, an indenoindolyl metal complex, and an activator. The activator can be MAO, ionic borates, or mixtures thereof. In a typical example, a solution containing MAO and the indenoindolyl metal complex is slowly added to stirred MAO-treated silica to provide a free-flowing powder catalyst system (i.e., an "incipient wetness" technique is used). A subsequent activation step is not used.

Of course, maximizing catalyst activity never goes out of style. Ideally, polyolefin manufacturers could achieve higher catalyst activities using the versatile indenoindolyl transition metal complexes without resorting to expensive or exotic activators. A valuable method would use conventional activators and would be easy to practice. A desirable method could provide catalyst systems with activities enhanced by an order of magnitude compared with known catalysts.

SUMMARY OF THE INVENTION

The invention is an improved catalyst preparation method. The method comprises two steps. First, a support is combined with an indenoindolyl Group 3-10 metal complex and a first activator comprising an alkyl alumoxane to provide a supported complex. The supported complex is subsequently combined with a second activator comprising an ionic borate. Activating indenoindolyl metal complexes in this sequence surprisingly provides an exceptional activity boost compared with other ways of activating them with either or both types of activators.

The invention includes a process comprising polymerizing ethylene and one or more optional comonomers in the presence of a catalyst comprising a borate-treated supported complex made by the method of the invention.

DETAILED DESCRIPTION OF THE INVENTION

The method of the invention involves two activation steps. In a first step, a support is combined with an indenoindolyl Group 3-10 transition metal complex and a first activator comprising an alkyl alumoxane to form a supported complex.

Catalysts made by the method of the invention are supported. Suitable supports include inorganic oxides, inorganic halides, inorganic silicates, organic polymer resins, and mixtures thereof. Preferred supports include silicas, alumina, silica-aluminas, titanias, magnesias, zirconias, clays, zeolites, magnesium halides, or the like. Silicas are particularly preferred.

Preferably, the support has a surface area in the range of about 10 to about 700 $m^2/g$, more preferably from about 50 to about 500 $m^2/g$, and most preferably from about 100 to about 400 $m^2/g$. Preferably, the pore volume of the support is in the range of about 0.1 to about 4.0 mL/g, more preferably from about 0.5 to about 3.5 mL/g, and most preferably from about 0.8 to about 3.0 mL/g. Preferably, the average particle size of the support is in the range of about 1 to about 500 μm, more preferably from about 2 to about 200 μm, and most preferably from about 5 to about 100 μm.

Preferably, the support is calcined or chemically treated prior to use to reduce the concentration of surface hydroxyl groups. Calcination is preferably performed at temperatures greater than about 100° C., more preferably greater than about 200° C. Chemical treatment involves combining the support with any of the known treating agents, preferably organoaluminum, organomagnesium, organoboron, or organosilicon compounds as is known in the art. See, for example, U.S. Pat. No. 6,211,311, the teachings of which are incorporated herein by reference. Alumoxanes are preferred treating agents for the support.

The method of the invention requires an indenoindolyl Group 3-10 transition metal complex. "Transition metals" include members of the lanthanide series in addition to traditional transition metals. Preferably, the transition metal is a Group 3-8, more preferably a Group 3-5, and most preferably a Group 4 transition metal such as zirconium or titanium.

The transition metal complex incorporates an indenoindolyl ligand that is bonded to the transition metal. Suitable indenoindolyl ligands and ways to name, synthesize, and incorporate them into transition metal complexes have been described in considerable detail elsewhere; see, for example, U.S. Pat. Nos. 6,838,410, 6,794,468, and 6,232,260, the teachings of which are incorporated herein by reference. Suitable procedures for making the ligands and complexes also appear in PCT Int. Appls. WO 99/24446 and WO 01/53360.

The indenoindolyl ligand is preferably bridged to a polymerization-stable ligand (cyclopentadienyl, indenyl, fluorenyl, indenoindolyl, or the like) through a divalent linking group according to well-known methods. A wide variety of bridged indenoindolyl metal complexes have been described, and their methods of preparation are described, for example, in U.S. Pat. Nos. 6,559,251, 6,838,410, and 6,908,972, the teachings of which are incorporated herein by reference.

The indene and indole rings can be fused in either an indeno[1,2-b]indolyl or an indeno[2,1-b]indolyl configuration. See U.S. Pat. No. 6,559,251 for an explanation of the distinction.

Bridged indenoindolyl ligands also include those used in open architecture complexes. By "open architecture," we mean a complex having a fixed geometry that enables generation of a highly exposed active site when the complex is combined with an activator. The metal of the complex is pi-bonded to the indenyl Cp ring and is also sigma-bonded through two or more atoms to the indolyl nitrogen or the indenyl methylene carbon. For examples of open architecture complexes and how to make them, see U.S. Pat. Nos. 6,559,251, 6,693,155, and 6,818,713, the teachings of which are incorporated herein by reference.

Additionally, the complex usually includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl).

In the first step of the method of the invention, the indenoindolyl Group 3-10 transition metal complex and the support are combined with a first activator. The first activator comprises an alkyl alumoxane. Suitable alkyl alumoxanes are well known in the art of olefin polymerization. Preferred alkyl alumoxanes are polymeric aluminum compounds represented by the cyclic formula $(R-Al-O)_s$ or the linear formula $R(R-Al-O)_sAlR$ wherein R is a $C_1-C_5$ alkyl group and s is an integer from 1 to about 20. Preferably, R is methyl and s is from about 4 to about 10. Exemplary alkyl alumoxane activators are methylalumoxane (MAO), ethylalumoxane, and diisobutylalumoxane. MAO is particularly preferred.

The optimum amount of first activator needed relative to the amount of transition metal complex depends on many factors, including the nature of the complex and first activator, the desired reaction rate, the kind of polyolefin product, the reaction conditions, and other factors. Generally, however, the amount used will be within the range of about 0.01 to about 5000 moles, preferably from about 10 to about 500 moles, and more preferably from about 10 to about 200 moles, of aluminum per mole of transition metal The transition metal complex, support, and first activator are combined by any suitable method to form a supported complex. A solvent is preferably used. In one convenient approach, the support is combined with a solution of the complex and first activator in a solvent (e.g., an aromatic or aliphatic hydrocarbon) to give a slurry. The slurry is then used "as is" or is stripped and preferably dried to provide a supported complex. In another convenient method, a solution of the complex and first activator in a minimal proportion of solvent is applied to the support under good stirring using incipient wetness.

Unlike previous indenoindolyl metal catalyst preparation methods, the method of the invention employs a subsequent activation step. In this second step, the supported complex prepared as described above is combined with a second activator comprising an ionic borate to produce a borate-treated supported complex.

Suitable ionic borates are well-known salts that contain a non-nucleophilic anion. The compounds generally have one or more bulky and often hydrophobic ligands attached to boron. Examples include lithium tetrakis(pentafluorophenyl)borate, trityl tetrakis(pentafluorophenyl)-borate (F20), anilinium tetrakis(pentafluorophenyl)borate, and the like. For other examples, see U.S. Pat. No. 5,198,401, the teachings of which are incorporated herein by reference.

The ionic borate is used in an amount effective to provide a substantial boost in activity compared with the activity of the catalyst after just the first activation step. Preferably, the ionic borate is used in an amount within the range of about 0.01 to about 100 moles, preferably from about 0.1 to about 10 moles per mole of transition metal.

The method of combining the ionic borate with the supported complex from the first step is not particularly critical. A solvent is preferably used. In one convenient approach, the supported complex is treated with a solution of an ionic borate in a solvent, preferably an aliphatic or aromatic hydrocarbon, to form a slurry. The borate-treated supported complex is then isolated from the slurry by any suitable means, including filtration, centrifugation, decanting, or the like. Preferably, the complex is dried thereafter. An incipient wetness technique can also be used. Thus, the supported complex can be combined with a solution containing the ionic borate and a minimal proportion of a solvent to provide the borate-treated supported complex.

The ionic borate cannot simply be mixed with the first activator and combined with the complex in a single activation step. We found that this alternative method for activating the complex, which is contemplated by U.S. Pat. No. 6,583,242 and exemplified by Comparative Examples 3, 6, and 9 below, provides inferior activation compared with using two separate activation steps (see Examples 1, 4, and 7, respectively). Moreover, we also found that using a two-step activation method in which the order of activating with alkyl alumoxane and ionic borate are reversed also produces poorer activation (see Comparative Examples 2, 5, and 8). Thus, it is important not only to activate in two separate steps, but also to activate first with the alumoxane and then with the ionic borate.

The invention includes an ethylene polymerization process. Ethylene is polymerized, optionally in the presence of one or more α-olefin comonomers, to produce an ethylene polymer. Suitable α-olefins include, for example, propylene, 1-butene, 1-hexene, 1-octene, and the like, and mixtures thereof. The process is performed in the presence of a catalyst which comprises a borate-treated supported complex made by the method of the invention.

The process can be used to make a variety of valuable ethylene polymers and copolymers, including, for example, high-density polyethylene (HDPE), medium-density polyethylene (MDPE), and linear low density polyethylene (LLDPE).

The following examples merely illustrate the invention. Those skilled in the art will recognize many variations that are within the spirit of the invention and scope of the claims.

Catalyst Preparation Method A (This Invention)

In a glovebox at room temperature, dry toluene (10 mL) is added to calcined silica (1.4 g, CARiACT G-3, product of FUJI Silysia Chemical Ltd., calcined at 600° C. for at least 6 h) in a Schlenk flask, and the resulting slurry is magnetically stirred. Methylalumoxane (MAO, 3.5 mL of 30 wt. % solution in toluene, product of Albemarle) is added, and the mixture stirs at room temperature for 16 h. Indenoindolyl zirconium complex 1, prepared as described Table 1, (82 mg, 0.16 mmol) is carefully added to the MAO-silica slurry. After stirring for 2 h at room temperature, toluene is stripped under vacuum. Continued vacuum drying gives the supported complex as a beige-brown powder (2.5 g).

In the glove box at room temperature, dry toluene (10 mL) is added to a mixture of the supported complex and trityl tetrakis(pentafluoro-phenyl)borate ("F20," 150 mg, 0.16 mmol), and the slurry is stirred for 2 h. The mixture is vacuum dried at room temperature, washed with dry hexanes (4×8 mL), and again vacuum dried. The supported catalyst (2.7 g), designated A1, is a dark green-grey powder.

Catalyst Preparation Method B (Comparative)

The procedure of Method A is followed except that the order of activation steps is reversed.

Thus, dry toluene (10 mL) is added to calcined silica (1.4 g) at room temperature, and the resulting slurry is magnetically stirred. F20 (150 mg, 0.16 mmol) is added, and the mixture stirs at room temperature for 16 h. Indenoindolyl zirconium complex 1 (82 mg, 0.16 mmol) is carefully added to the borate-silica slurry. After stirring for 2 h at room temperature, toluene is stripped under vacuum. Continued vacuum drying gives the supported complex as a green powder (1.7 g).

In the glove box at room temperature, dry toluene (10 mL) is added to the supported complex, and MAO (3.5 mL of 30 wt. % solution in toluene) is added. The slurry is stirred for 2 h, vacuum dried at room temperature, washed with dry hexanes (4×8 mL), and again vacuum dried. The supported catalyst (2.7 g), designated B1, is a dark green powder.

Catalyst Preparation Method C (Comparative)

In this example, a mixture of the activators is used in a single activation step.

Thus, in the glovebox at room temperature, F20 (150 mg, 0.16 mmol) is slowly added to MAO (3.5 mL of 30 wt. % solution in toluene) to form a yellow-orange solution. The activator solution is then added to a slurry of calcined silica (1.4 g) in dry toluene (10 mL), and the slurry stirs at room temperature for 16 h. Indenoindolyl zirconium complex 1 (82 mg, 0.16 mmol) is carefully added to the MAO/borate-silica slurry. After stirring for 2 h at room temperature, toluene is stripped under vacuum. Continued vacuum drying gives the supported catalyst, designated C1, as a dark green powder (2.7 g).

Preparation of Additional Supported Catalysts

The procedures outlined above are used to prepare supported catalysts from complex 2 (74 mg, 0.16 mol) by each of Methods A, B, and C (hereinafter catalysts A2, B2, and C2, respectively). The procedures are also followed to prepare catalysts from, complex 3 (82 mg, 0.16 mol) by each of Methods A, B, and C (hereinafter catalysts A3, B3, and C3, respectively).

Ethylene Polymerizations

A one-liter, stainless-steel reactor having multiple injector ports is charged with 1-butene (5 mL). Triisobutylaluminum (TIBAL, 0.5 mL of 1.0 M solution in heptane, 0.5 mmol) and Armostat 710 fatty amine (1 mg, product of Akzo Nobel) in heptane solution (0.25 mL) are mixed in one sidearm of the injector. The mixture is then flushed into the reactor with nitrogen pressure and isobutane (about 400 mL). The reactor is pressurized with ethylene to 310 psig, and the reactor contents are allowed to equilibrate at 75° C. A sample of supported catalyst (15 mg) is pre-loaded into the other injector arm and is then flushed into the reactor with isobutane (90 mL) and nitrogen pressure. After the polymerization proceeds to produce about 90 g of resin, the reactor is vented and the resulting ethylene polymer is collected and dried. Results are summarized in Table 1.

As the results in Table 1 demonstrate, the precise sequence of activating indenoindolyl complexes makes a difference. Activation with an alumoxane first, then an ionic borate (Method A, Examples 1, 4, and 7) provides exceptional catalyst activity compared with either the reverse order of activation (Method B, Comparative Examples 2, 5, and 8) or a single activation step with a mixture of MAO and an ionic borate (Method C, Comparative Examples 3, 6, and 9).

The preceding examples are meant only as illustrations. The following claims define the invention.

Organometallic Complexes Used in the Examples

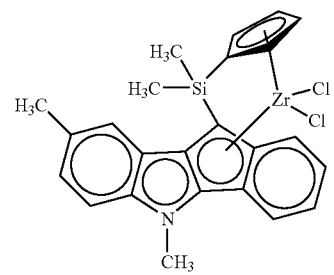

Me₂Si-bridged[1,2-b]Cp

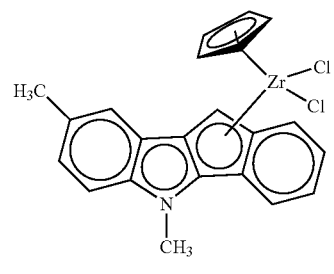

unbridged[1,2-b]Cp

-continued

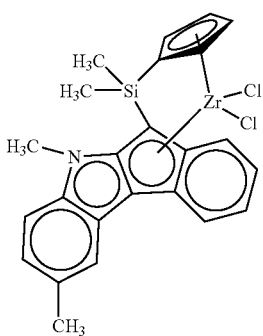

Me₂Si-bridged[2,1-b]Cp

TABLE 1

Effect of Catalyst Preparation Method on Activity

| Ex | Complex | Preparation Method | Supported Catalyst | First Activator | Second Activator | Activity (g/g · cat · h) |
|---|---|---|---|---|---|---|
| 1 | 1 | A | A1 | MAO | F20 | 23,200 |
| C2 | 1 | B | B1 | F20 | MAO | 5,900 |
| C3 | 1 | C | C1 | MAO/F20 | — | 7,100 |
| 4 | 2 | A | A2 | MAO | F20 | 16,000 |
| C5 | 2 | B | B2 | F20 | MAO | 300 |
| C6 | 2 | C | C2 | MAO/F20 | — | 10,300 |
| 7 | 3 | A | A3 | MAO | F20 | 33,300 |
| C8 | 3 | B | B3 | F20 | MAO | 330 |
| C9 | 3 | C | C3 | MAO/F20 | — | 15,800 |

Polymerization conditions: 1-L reactor; 5 mL 1-butene; 310 psi total pressure; no added hydrogen; 490 mL isobutane, 1 mg Armostat 710 antistatic agent, 75° C.
Complex 1 is a Me₂Si-bridged Cp(indeno[1,2-b]indolyl)zirconium dichloride, prepared as described in U.S. Pat. No. 6,756,455.
Complex 2 is a Cp(indeno[1,2-b]indolyl)zirconium dichloride, prepared as described in U.S. Pat. No. 6,559,251.
Complex 3 is a Me₂Si-bridged Cp(indeno[2,1-b]indolyl)zirconium dichloride, prepared as described in U.S. Pat. No. 6,559,251.

I claim:

1. A method which comprises:
   (a) combining a support with an indenoindolyl Group 3-10 metal complex and a first activator comprising an alkyl alumoxane to form a supported complex; and
   (b) subsequently combining the supported complex with a second activator comprising an ionic borate to produce a borate-treated supported complex.

2. The method of claim 1 wherein the support is calcined at a temperature greater than 200° C. before combining it with the Group 3-10 metal complex.

3. The method of claim 1 wherein the indenoindolyl complex is bridged.

4. The method of claim 1 wherein the Group 3-10 metal is titanium or zirconium.

5. The method of claim 1 wherein the alkyl alumoxane is MAO.

6. The method of claim 1 wherein the ionic borate is trityl tetrakis(pentafluorophenyl)borate.

7. The method of claim 1 wherein the support is combined with a solution of the metal complex and the first activator to form a mixture.

8. The method of claim 7 wherein volatiles are removed from the mixture under vacuum to give the supported complex.

9. The method of claim 1 wherein the supported complex is treated with an ionic borate solution to form a slurry.

10. The method of claim 9 wherein the borate-treated supported complex is isolated from the slurry.

11. A process which comprises polymerizing ethylene, and optionally an α-olefin, in the presence of catalyst comprising a borate-treated supported complex prepared by the method of claim 1.

12. The process of claim 11 wherein the α-olefin is selected from the group consisting of propylene, 1-butene, 1-hexene, 1-octene, and mixtures thereof.

* * * * *